United States Patent
Xu et al.

(10) Patent No.: US 12,437,402 B2
(45) Date of Patent: Oct. 7, 2025

(54) ALLERGENIC SPECIES BROADCASTING METHOD AND SYSTEM AND READABLE STORAGE MEDIUM

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 18/846,264

(22) PCT Filed: Feb. 28, 2023

(86) PCT No.: PCT/CN2023/078610
§ 371 (c)(1),
(2) Date: Sep. 11, 2024

(87) PCT Pub. No.: WO2023/179317
PCT Pub. Date: Sep. 28, 2023

(65) Prior Publication Data
US 2025/0200745 A1    Jun. 19, 2025

(30) Foreign Application Priority Data
Mar. 22, 2022   (CN) .......................... 202210289068.0

(51) Int. Cl.
G06T 7/00     (2017.01)
G06T 7/70     (2017.01)
H04N 23/60    (2023.01)

(52) U.S. Cl.
CPC .............. *G06T 7/0012* (2013.01); *G06T 7/70* (2017.01); *H04N 23/64* (2023.01); *G06T 2207/30188* (2013.01)

(58) Field of Classification Search
None
See application file for complete search history.

(56) References Cited

U.S. PATENT DOCUMENTS

2021/0166815 A1    6/2021   Van Der Sluis

FOREIGN PATENT DOCUMENTS

| CN | 106447170 | 2/2017 |
|----|-----------|--------|
| CN | 111291689 | 6/2020 |

(Continued)

OTHER PUBLICATIONS

Xu, Junfeng, et al. "Exploring spatial distribution of pollen allergenic risk zones in urban China." Sustainability 8.10 (2016): 978. (Year: 2016).*

(Continued)

*Primary Examiner* — Samah A Beg
(74) *Attorney, Agent, or Firm* — JCIPRNET

(57) ABSTRACT

The invention provides an allergenic species broadcasting method and system and a readable storage medium. The allergenic species broadcasting method comprises: by a plant recognition model, identifying species information and growth stage information of a plant in an image; if the current plant is an allergenic species, acquiring sensitization information and location information thereof; and pushing protection information to a related user according to the sensitization information and the location information of the allergenic species. The solution provided in the present invention can present, by an allergenic species broadcast map, to a user the specific species information, location information, sensitization information and protection information of an allergenic species in a current area and can meanwhile push warning information or early warning information of the related allergenic species, thereby (Continued)

reminding a corresponding user to keep away from the corresponding area so as to prevent allergic symptoms.

13 Claims, 2 Drawing Sheets

(56) References Cited

FOREIGN PATENT DOCUMENTS

| | | | | |
|---|---|---|---|---|
| CN | 111325240 | | 6/2020 | |
| CN | 111325240 A | * | 6/2020 | ........... A01B 79/005 |
| CN | 112686159 | | 4/2021 | |
| CN | 112686159 A | * | 4/2021 | |
| CN | 113469537 | | 10/2021 | |
| CN | 114707585 | | 7/2022 | |
| WO | 2021159990 | | 8/2021 | |

OTHER PUBLICATIONS

"International Search Report (Form PCT/ISA/210) of PCT/CN2023/078610", mailed on May 30, 2023, with English translation thereof, pp. 1-5.

"Written Opinion of the International Searching Authority (Form PCT/ISA/237) of PCT/CN2023/078610", mailed on May 30, 2023, pp. 1-4.

Yuzuo Zhang et al., "Remote rapid recognition method for plants", Journal of Computer Applications, vol. 36, Sep. 2016, pp. 206-209.

* cited by examiner

Allergenic species broadcasting system — 200

Processor — 210

Memory — 220

FIG. 3

ALLERGENIC SPECIES BROADCASTING METHOD AND SYSTEM AND READABLE STORAGE MEDIUM

CROSS-REFERENCE TO RELATED APPLICATION

This application is a 371 of international application of PCT application serial no. PCT/CN2023/078610, filed on Feb. 28, 2023, which claims the priority benefit of China application no. 202210289068.0, filed on Mar. 22, 2022. The entirety of each of the above mentioned patent applications is hereby incorporated by reference herein and made a part of this specification.

TECHNICAL FIELD

The present disclosure relates to the technical field of object recognition, and in particular to an allergenic species broadcasting method and system and a readable storage medium.

DESCRIPTION OF RELATED ART

Plants are the creators of the environment we live in. Plants produce oxygen, provide food and energy, sterilize bacteria and prevent dust, retain water and reduce noise. Flowers of plants bloom and fall, beautifully and colorfully, enriching our beautiful life. Plants are everywhere in life, and people's life is absolutely inseparable from plants. However, some organs of some plants are toxic or might cause allergies. Contact, inhalation or consumption of such plants might cause serious consequences, such as pollen allergy, allergic reactions to catkin and other different allergic symptoms.

Take pollen allergy as an example, which refers to symptoms caused by pollen of plants, and mainly affects eyes and upper respiratory tract. The symptoms are mostly induced by pollen transmitted by wind. Common pathogenic pollens include pollen from the genus Artemisia, sunflower, sycamore, castor, amaranth, cucurbit, poplar, elm, etc.

Therefore, there is a need for early warning information on allergenic species.

SUMMARY

One of the purposes of the present disclosure is to provide an allergenic species broadcasting method, including:
identifying species information and growth stage information of a plant in an image by means of a plant recognition model;
if a current plant is an allergenic species, acquiring sensitization information and location information of the allergenic species;
pushing protection information to a related user according to the sensitization information and the location information of the allergenic species.

In some embodiments, pushing protection information to the related user according to the sensitization information and the location information of the allergenic species includes:
determining whether the allergenic species is in a sensitization period according to the sensitization information, the growth stage information and/or current time information of the allergenic species, and pushing the protection information to the related user according to a determining result.

In some embodiments, when the allergenic species is in the sensitization period, allergen warning information is pushed to a user within a set area scope.

In some embodiments, when the allergenic species is not in the sensitization period, the allergen early warning information is pushed to the user within the set area scope, once the allergenic species is in the sensitization period, the allergen warning information is further pushed to the user within the set area scope.

In some embodiments, when the allergenic species is in the sensitization period, the location information and photographing time information of the allergenic species are obtained and annotated and displayed on a regional map.

In some embodiments, when the allergenic species is in the sensitization period, a affected degree of the allergenic species on different area scopes is differentiated, annotated and displayed.

In some embodiments, overlapping parts of the area scopes affected by different allergenic species may be superimposed and differentiated, annotated and displayed.

In some embodiments, the number of varieties, the number of individuals, and the distribution density of allergenic species are calculated for different area scopes to determine the sensitization level of the corresponding area for categorization.

In some embodiments, differentiating, annotating and displaying the affected degree on different area scopes includes: obtaining weather information of a current area, and adjusting the affected area and the affected degree of the allergenic species according to the weather information.

In some embodiments, the method further includes: if the allergenic species is not identified at a current location within a set time period, but an allergenic species exists at the current location in a historical record, obtaining the sensitization information and a sensitization period of the allergenic species, and pushing protection information that the allergenic species might exist at the current location to the related user during the sensitization period.

In some embodiments, the sensitization information includes allergy information, information of an allergy transmission method, information of a protection method and/or information of a treatment method.

In some embodiments, pushing protection information to the related user according to the sensitization information and the location information of the allergenic species includes the following:
pushing protection information to the related user within the set area scope based on the allergy information pre-set by the user.

According to another aspect of the present disclosure, a readable storage medium is provided and a program is stored therein, and when the program is executed, the allergenic species broadcasting method described above is implemented.

According to another aspect of the present disclosure, an allergenic species broadcasting system is provided, including a processor and a memory, wherein a program is stored in the memory, and when the program is executed by the processor, the allergenic species broadcasting method described above is implemented.

Other features and advantages of the present disclosure will become more apparent from the following detailed description of exemplary embodiments of the present disclosure with reference to the accompanying drawings.

BRIEF DESCRIPTION OF THE DRAWINGS

The accompanying drawings, which constitute a part of the specification, illustrate embodiments of the present disclosure and, together with the description, serve to explain the principles of the present disclosure.

FIG. 3 is a schematic diagram showing a structure of an allergenic species broadcasting system provided in an embodiment of the present disclosure.

Figure 1:
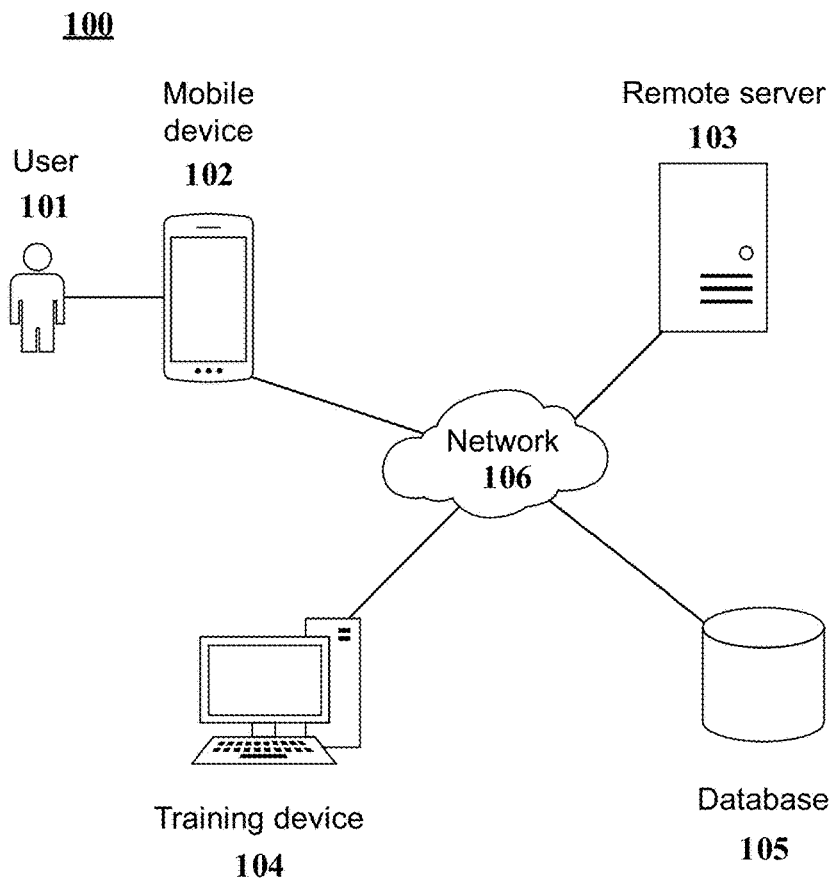
FIG. 1 is a schematic diagram showing a network environment of an allergenic species broadcasting system provided in a preferred embodiment of the present disclosure.

Note that in the embodiments described below, sometimes the same reference numerals are used for different drawings to represent the same parts or parts with the same functions, and repeated descriptions are omitted. In some cases, similar numbers and letters are used to represent similar items, so if an item is defined in one drawing, the item does not need to be further discussed in subsequent drawings.

For ease of understanding, the position, size, range, etc. of various structures shown in the drawings and the like may not represent the actual position, size, range, etc. Therefore, the present disclosure is not limited to the position, size, range, etc. disclosed in the drawings and the like.

DESCRIPTION OF THE EMBODIMENTS

Various exemplary embodiments of the present disclosure will be described in detail below with reference to the accompanying drawings. It should be noted that unless otherwise specifically stated, the relative arrangement of components and steps, numerical expressions and numerical values set forth in these embodiments do not limit the scope of the present disclosure.

The following description of at least one exemplary embodiment is in fact merely illustrative and is in no way intended to limit the present disclosure and application or use thereof. That is, the structures and methods herein are shown in an exemplary manner to illustrate different embodiments of the structures and methods in the present disclosure. However, those skilled in the art will understand that they merely illustrate exemplary ways of the present disclosure that can be implemented, rather than exhaustive ways. In addition, the drawings need not be drawn to scale, and some features may be enlarged to illustrate the details of specific components.

Technologies, methods, and apparatus known to ordinary technicians in the relevant field may not be discussed in detail, but where appropriate, such technologies, methods, and apparatus should be considered part of the granted specification.

In all examples shown and discussed herein, any specific values should be interpreted as merely exemplary and not as limiting. Therefore, other examples of the exemplary embodiments may have different values.

The inventors of the present disclosure have conducted in-depth research on an allergenic species broadcasting method and system. FIG. 1 is a schematic diagram showing a network environment of an allergenic species broadcasting system provided in a preferred embodiment of the present disclosure.

The network environment 100 of the allergenic species broadcasting system may include a mobile device 102, a remote server 103, a training device 104, and a database 105, and they are coupled to each other by wire or wirelessly via a network 106. The network 106 may be embodied as a wide area network (such as a mobile phone network, a public switched telephone network, a satellite network, the Internet, etc.), a local area network (such as Wi-Fi, Wi-Max, ZigBee™, Bluetooth™, etc.), and/or other forms of networking capabilities.

The mobile device 102 may include a mobile phone, a tablet computer, a laptop computer, a personal digital assistant, and/or other computing devices configured to capture, store, and/or transmit images such as digital photos. Therefore, the mobile device 102 may include an image capturing device such as a digital camera and/or may be configured to receive images from other devices. The mobile device 102 may include a display. The display may be configured to provide one or more user interfaces to the user 101, and the user interface may include multiple interface elements, and the user 101 may interact with the interface elements, etc. For example, the user 101 may use the mobile device 102 to take a photo of a plant and upload or store an image. The mobile device 102 may output to the user detailed information such as category information, location information, sensitization information, and protection information related to the allergenic species, or may display to the user an allergenic species broadcasting map, and push allergenic species warning and early warning information, and the user may also share allergenic species information with other users or friends, etc.

The remote server 103 may be configured to analyze images received from the mobile device 102 via the network 106 to determine the type of allergenic species and identify detailed information such as the growth stage of the allergenic species. The remote server 103 may also be configured to establish and train a plant recognition model of this embodiment. The specific training process of the plant recognition model will be described below in conjunction with the specific embodiment.

The training device 104 may be coupled to the network 106 to facilitate the training of the plant recognition model. The training device 104 may have multiple CPUs and/or GPUs to assist in training the plant recognition model.

The database 105 may be coupled to the network 106 and provide the data required for the remote server 103 to perform related calculations. For example, the database 105 may include a sample library storing a large number of images of plants of different species, and a sample library storing images of plants of multiple growth stages under the same species. In an embodiment, taking the Chinese parasol tree as an example, the sample library may include a large number of image samples of Chinese parasol trees of different species in different locations, different seasons, different times and weathers and different photographing angles. In an embodiment, the selected plant photos taken by the user may further be stored in the sample library corresponding to the plant species, and in the meantime, the growth stage information and morphological information corresponding to one or more of the location information, season information, time information, weather information and photographing angle information of the plant may also be recorded in the database. The database may be implemented by various database technologies known in the art. The remote server 103 may access the database 105 as needed to perform related operations.

It should be understood that the network environment 100 herein is only an example, and those skilled in the art may add more devices or delete some devices as required, and may modify the functions and configurations of some devices.

Figure 2:
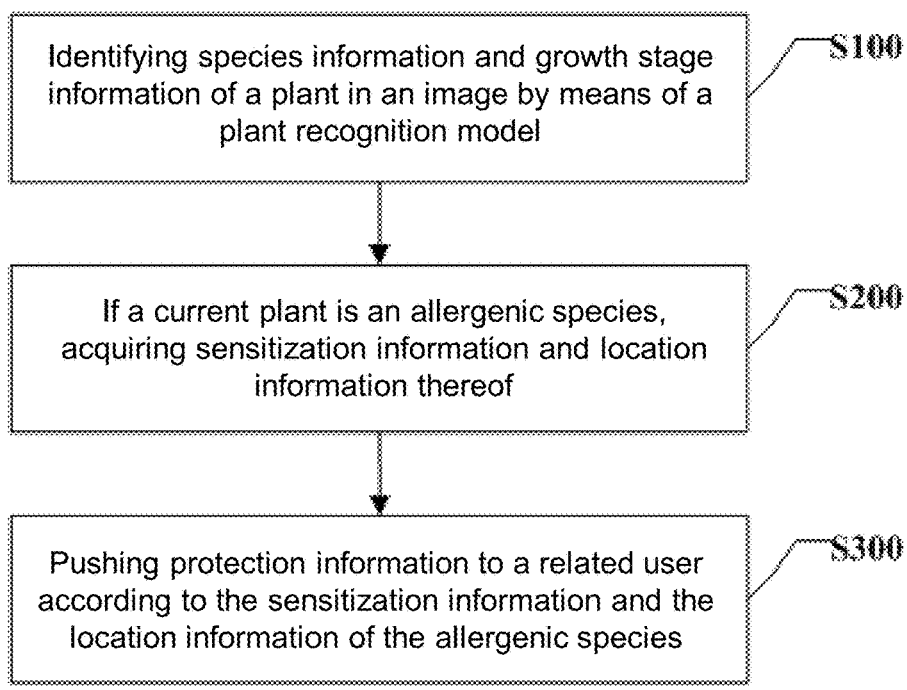
FIG. 2 is a schematic diagram showing a flow chart of an allergenic species broadcasting method provided in an embodiment of the present disclosure.

FIG. 2 is a schematic diagram showing a flow chart of an allergenic species broadcasting method provided in an embodiment of the present disclosure. The method may be implemented in an application (app) disposed on a smart terminal such as a mobile phone or a tablet computer. As shown in FIG. 1, the method includes the following:

step S100: identifying species information and growth stage information of a plant in an image by means of a plant recognition model;

step S200: if a current plant is an allergenic species, acquiring sensitization information and location information thereof;

step S300: pushing protection information to a related user according to the sensitization information and the location information of the allergenic species.

The plant recognition model may be a neural network model, specifically a convolutional neural network model or a residual network model. The convolutional neural network model is a deep feedforward neural network, which uses a convolution kernel to scan the species image, extracts multiple features to be identified in the species image, and then identifies the features of the species to be identified. In addition, in the process of identifying the species image, the original species image may be directly input into the convolutional neural network model without preprocessing the species image. Compared with other recognition models, the convolutional neural network model has higher recognition accuracy and efficiency.

Compared with the convolutional neural network model, the residual network model has an additional identity mapping layer, which may avoid accuracy saturation or even decline caused by the increase of network depth (the number of stacked layers in the network). The identity mapping function of the identity mapping layer in the residual network model needs to satisfy: the sum of the identity mapping function and the input of the residual network model is equal to the output of the residual network model. After identity mapping is introduced, the residual network model has more obvious changes in the output, so it is possible to significantly improve the accuracy and efficiency of species feature recognition.

In some embodiments, training the feature classification model may include the following:

obtaining the first sample set having the preset number of species images annotated with multiple feature information;

determining a proportion of species images from the first sample set as a first training set;

training the feature classification model using the first training set; and terminating the training when the first training accuracy is greater than or equal to the first preset accuracy, and obtaining a trained feature classification model.

Specifically, the first sample set may include a large number of species images, and each species image is annotated with corresponding multiple features thereof. The species image is input into the feature classification model to generate output feature information, and then the related parameters in the feature classification model may be adjusted according to the comparison result between the output feature information and the annotated feature information, that is, the feature classification model is trained and the training is terminated until the first training accuracy of the feature classification model is greater than or equal to the first preset accuracy, thereby obtaining a trained feature classification model. Based on a species image, the feature classification model may also output multiple candidate features, each of which may have a corresponding feature confidence thereof for further analysis and screening.

Furthermore, the trained feature classification model may be tested, which may specifically include the following:

determining a proportion of species images from the first sample set as a first test set;

determining a first model accuracy of the trained feature classification model using the first test set; and adjusting the first training set and/or the feature classification model for retraining when the first model accuracy is less than the second preset accuracy.

Generally, the species images in the first test set and the first training set are not exactly the same, so the first test set may be used to test whether the feature classification model also has a good recognition effect on species images outside the first training set. During the test, the first model accuracy of the feature classification model is calculated by comparing the output feature information generated according to the species images in the first test set and the annotated feature information. In some examples, the calculation method of the first model accuracy may be the same as the calculation method of the first training accuracy. When the first model accuracy obtained from the test is less than the second preset accuracy, it indicates that the recognition effect of the feature classification model is not good enough, so the first training set may be adjusted. For example, the number of species images annotated with feature information in the first training set may be increased, or the feature classification model itself may be adjusted, or both of the two may be adjusted, and then the feature classification model may be retrained to improve the recognition effect thereof. In some embodiments, the second preset accuracy may be set to be equal to the first preset accuracy.

The plant recognition model may be, for example, a neural network model established in advance through sample training, such as a convolutional neural network model or a residual network model. The same recognition model may be used to identify the species and growth stage of the plant together, or two separate models may be used to identify the species and growth stage of the plant respectively. The growth stage may include one of the seed/seedling stage, the vegetative stage (leaf stage), the growing stage, the flowering stage, the fruiting stage, the leaf-falling stage, the dormant stage, and the drying stage. In addition, the growth stage may further include picked leaves, fallen flowers or fruits, and other different growth stages or different forms and parts. All of the above may be identified by training with annotated samples to establish a recognition model.

The received image may be previously stored by the user or captured by the user in real time. For example, the image may be previously stored by the user in the mobile device 102 or captured in real time by the user using an external camera connected to the mobile device 102 or a camera built into the mobile device 102. In an embodiment, the user may further obtain the image in real time through a network.

In some embodiments, pushing protection information to the related user according to the sensitization information and the location information of the allergenic species includes the following: determining whether the allergenic species is in the sensitization period according to the sensitization information, the growth stage information and/or the current time information of the allergenic species, and thereby determining the specific content of the protection information to be pushed to the related user. For example, willow catkins appear during the fruiting period of willow, that is, the fruiting period of willow is the sensitization period. To determine whether the current plant is an allergenic plant and a poisonous species identification category, the sensitization and sensitization period of the current species may be obtained through the species information pre-stored in the content management database. For example, it is obtained that the sensitization period of the willow is the fruiting period, and then it is identified whether the growth stage of the willow is in the fruiting period to determine whether the willow is in the sensitization period. The sensitization period may also be identified without identifying the growth stage. The time information alone may be used to determine whether the allergenic species is in the sensitization period at the current time. For example, catkins generally appear from April to May each year, so it may be assumed that the sensitization period of the willow is from April to May. In the meantime, the sensitization period may also be comprehensively determined and confirmed by combining the growth stage information with time information. Some plants produce allergens during their sensitization periods at a specific time in a certain growth state. Allergenic plants that are not in the sensitization period may provide early warning information for display, and once the allergenic plants are in the sensitization period, warning information may be pushed to the related user in the area. If an allergenic plant is not in the sensitization period based on the growth status, but the current time falls within the sensitization period, notification will be generated to notify that the allergenic plant is likely to enter the sensitization period at any time until the next time the allergenic plant is photographed again and the growth stage thereof is identified to enter the sensitization period, then the allergen warning information will be directly pushed to the related user.

When the allergenic species is in the sensitization period, allergen warning information is pushed to related user within the set area scope. Allergenic plants in the sensitization period are annotated and displayed on the allergen broadcasting map through obtaining the times and locations of the photos captured by the user, and the allergen broadcasting map is pushed to the user in the corresponding area (for example, within 5 kilometers), and may also be actively shared with users or friends in a specific area. The allergenic species broadcasting system may further obtain the user's location information in real time, and push related allergen warning information to the user once the area scope the user enters has allergenic plants.

In some embodiments, when the allergenic species is not in the sensitization period, allergen early warning information is pushed to the user within the set area scope, and once the allergenic species is in the sensitization period, allergen warning information is further pushed to the user within the set area scope. When the allergenic species is in the sensitization period, the location information and photographing time information of the allergenic species are obtained, annotated and displayed on the regional map.

When the allergenic species is in the sensitization period, the affected degree of the allergenic species on different area scopes is differentiated, annotated and displayed. Corresponding colors may be used for illustration according to the affected degree of allergenic plants in different area scopes on the map. For example, the area scope within 50 meters closest to the allergenic plant is annotated in red, the area scope within 50 meters to 100 meters from the allergenic plant is annotated in orange, the area scope within 100 meters to 200 meters from the allergenic plant is annotated in yellow, and the area scope without allergen information is annotated in green, etc., to notify the user of the area scope affected by different allergenic plants and pay attention to avoid the corresponding areas.

In some embodiments, overlapping parts of the area scopes affected by different allergenic species may be superimposed and differentiated, annotated and displayed.

The number of varieties, the number of individuals, and the distribution density of allergenic species (especially wind-pollinated allergenic species) are calculated for different area scopes to determine the sensitization level (sensitization risk index) of the corresponding area for categorization. For example, the distribution density of allergenic plants in different areas may be calculated based on the cumulative identification or allergenic plant information identified and reported by other users combined with the area of different sizes. Similarly, areas with different sensitization levels may also be displayed to the user in an interactive way by illustrating different colors for different levels.

In some embodiments, differentiating, annotating, and displaying the affected degree on different area scopes further includes: obtaining weather information of the current area, and adjusting the affected area and affected degree of the allergenic species according to the weather information. The allergenic species broadcasting system may calculate the danger level of different areas, the affected range of allergenic species, etc. by obtaining weather information such as the weather, temperature, humidity, wind direction and wind speed of the current area. For example, the risk level is higher in sunny days than in rainy days, and the risk level is higher when the wind speed is high. The affected area scopes varies depending on different wind directions and wind speeds. Through corresponding calculations, the allergen broadcasting system may more accurately obtain the risk level of different areas at present, so that the user may plan travel routes and avoid corresponding dangerous areas. The acquisition of weather and other information is obtained based on the user's location information, and the warning level and corresponding affected range of different areas may be updated in real time according to the weather information.

In the meantime, the allergenic species broadcasting system may also fit the sensitization risk index based on the global distribution of allergenic species and the user's geographical location, such as calculating the distribution density of allergenic species in different regions around the world by combining the distribution data of allergenic species from the global biodiversity information agency and the distribution of allergenic species obtained from the species identification system, and estimating the concentration of allergens in various time periods based on the list of wind-pollinated allergenic species combined with the season and climate and other information of the regional location, thereby obtaining the sensitization risk index based on the above data.

In some embodiments, the method further includes: if the allergenic species is not identified at the current location within a set time period, but allergenic species exists in the current location in the historical records, obtaining the sensitization information and sensitization period information of the allergenic species, and pushing protection information that allergenic species might exist at the location to the related user during the sensitization period. The user may click on the allergen broadcasting map to view the status of allergenic plants in the corresponding area or all areas. In some areas, there might be location information (such as this year or this season) where no allergenic plants have been reported in the current time period. However, when there is an allergenic plant at this location in the historical record, the time of the previous sensitization period and allergenic species information of the allergenic species are captured and displayed as the current estimated time and estimated allergenic species information, notifying the user that there might be corresponding allergenic plants at this location and to pay attention to corresponding preventive measures to protect himself/herself. Subsequently, if a user arrives at the current location and recognizes that the corresponding allergenic plant no longer exists in the image taken by the user, the related allergenic plant information database will be updated. For example, the user is guided to take multiple photos (or panoramic photos) covering the range of 360 degrees at the same location, so that the plant recognition model may be used to identify whether there are still previously recorded allergenic plants.

In some embodiments, the sensitization information includes allergy information, allergy transmission methods, protection methods and treatment method information. The user may also click on the annotation on the allergen broadcasting map to view the locations where allergenic plants appear at the current time, and the plant variety information and allergenic information may be displayed simultaneously, such as allergy information, allergy transmission methods, protection methods and treatment methods, etc. The allergenic broadcasting map displays a reduced-size icon for photos of allergenic plants taken by the user. By clicking on the icon, it is possible to view multiple full-sized photos and photos of the current location taken by other users. The reduced-size icon may automatically select photos containing allergens for display (for example, selection of photos of willow trees may include photos of catkins).

Pushing protection information to the related user based on the sensitization information and location information of the allergenic species includes: pushing protection information to the related user within a set area scope based on allergy information preset by the user. The user may set his/her own allergy information in advance, and then click to see whether there are allergenic plants involved in the corresponding area, as well as the location information indicating the areas where the allergenic plants appear. The allergenic species broadcasting system may also choose to push the corresponding allergen warning information based on the allergy information set by the user.

Based on the same inventive concept, the present disclosure further provides an allergenic species broadcasting system. As shown in FIG. 3, the allergenic species broadcasting system 200 may include a processor 210 and a memory 220. Instructions are stored in the memory 220. When the instructions are executed by the processor 210, the steps in the allergenic species broadcasting method described above may be implemented.

The processor 210 may perform various operations and processes according to instructions stored in the memory 220. Specifically, the processor 210 may be an integrated circuit chip with signal processing capabilities. The above-mentioned processor may be a general-purpose processor, a digital signal processor (DSP), an application-specific integrated circuit (ASIC), a field-programmable gate array (FPGA) or other programmable logic devices, discrete gate or transistor logic devices, or discrete hardware components. Various methods, steps and logical block diagrams disclosed in the embodiments of the present disclosure may be implemented or executed. The general-purpose processor may be a microprocessor or the processor may be any conventional processor, etc., and may be an X86 architecture or an ARM architecture, etc.

The memory 220 stores executable instructions, which are executed by the processor 210 as described above in the allergenic species broadcasting method. The memory 220 may be a volatile memory or a non-volatile memory, or may include both volatile memory and non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which serves as an external cache. By way of illustration, but not limitation, many forms of RAM are adoptable, such as a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous linked dynamic random access memory (SLDRAM) and a direct memory bus random access memory (DR RAM). It should be noted that memory for the methods described herein is intended to include, but is not limited to, these and any other suitable types of memory.

Based on the same inventive concept, the present disclosure further provides a computer-readable storage medium. Instructions are stored in the computer-readable storage medium. When the instructions are executed, the steps in the allergenic species broadcasting method described above may be implemented.

Similarly, computer-readable storage media in embodiments of the present disclosure may be a volatile memory or a non-volatile memory, or may include both volatile memory and non-volatile memory. It should be noted that computer-readable storage media described herein are intended to include, but not limited to, these and any other suitable types of memory.

It should be noted that the flow charts and block diagrams in the accompanying drawings illustrate the possibly implementable architecture, functions and operations of systems, methods and computer program products according to various embodiments of the present disclosure. In this regard, each block in the flow chart or block diagrams may represent a module, segment, or portion of code that contains one or more executable instructions for implementing the specified logic functions. It should also be noted that, in some alternative implementations, the functions annotated in the block may take place differently from the sequence shown in the figures. For example, two consecutive blocks may actually be executed substantially in parallel, or they may sometimes be executed in a reverse order, depending on the functions involved. It should also be noted that each block of the block diagram and/or flow chart, and combinations of blocks in the block diagram and/or flow chart, may be implemented by special-purpose hardware-based systems that perform the specified functions or operations, or may be implemented using a combination of special-purpose hardware and computer instructions.

Generally speaking, the various example embodiments of the disclosure may be implemented in hardware or special-purpose circuits, software, firmware, logic, or any combination thereof. Certain aspects may be implemented in hardware, while other aspects may be implemented in firmware or software that may be executed by a controller, a microprocessor, or other computing device. While aspects of embodiments of the disclosure are illustrated or described as block diagrams, flow charts, or using some other graphical illustration, it will be understood that the blocks, devices, systems, techniques, or methods described herein may be used as non-limiting examples, which are implemented in hardware, software, firmware, special-purpose circuit or logic, general-purpose hardware or controllers, or other computing devices, or some combination of the above.

It should be noted that each embodiment in this specification is described in a related manner. The same and similar parts of the various embodiments may serve as cross-reference for each other. Each embodiment focuses on the differences from other embodiments. In particular, as for the system and the computer-readable storage medium, since they are basically similar to the method embodiments, the description thereof is relatively simple. For related details, please refer to some of the descriptions of the method embodiments.

In this document, relational terms such as first, second, etc. are used merely to distinguish one entity or operation from another entity or operation and do not necessarily require or imply actual relationship or sequence between these entities or operations. Furthermore, the terms "comprises," "include," or any other variations thereof are intended to cover a non-exclusive inclusion such that a process, a method, an object, or an apparatus that includes a list of elements includes not only those elements, but also other elements not expressly listed, or elements inherent to the process, method, object or apparatus. Without further limitation, an element defined by the statement "comprises a . . . " does not exclude the presence of additional identical elements in a process, a method, an object, or an apparatus that includes the stated element.

The above description is only a description of the preferred embodiments of the present disclosure, and does not limit the scope of the present disclosure in any way. Any changes or modifications made by those of ordinary skill in the field of the present disclosure based on the above disclosure shall fall within the scope of the claims.

What is claimed is:

1. An allergenic species broadcasting method, characterized in comprising:
    training a plant recognition model by a remote server, and in response to receiving an image from a mobile device in the remote server, performing following steps by the remote server, comprising:
    identifying species information and growth stage information of a plant in the image by the plant recognition model;
    in response to determining that the plant belongs to one of a plurality of allergenic species, treating the plant as an allergenic species, acquiring sensitization information of the allergenic species and location information of the allergenic species, and pushing protection information to a related user according to the sensitization information of the plant and the location information of the plant;
    in response to not identifying any one of the plurality of allergenic species in the image received from the mobile device at a current location within a set time period, but a historical record recording having a previously recorded allergenic plant belonging to one of the plurality of allergenic species at the current location, comprising:
    obtaining the sensitization information and sensitization period information of the previously recorded allergenic plant, and pushing the protection information indicating that a previously recorded allergenic species is likely to exist at the current location to the related user during the sensitization period;
    when subsequently another user arrives at the current location, guiding the another user to take a plurality of photos or panoramic photos covering a range of 360 degrees; and
    after receiving the plurality of photos or panoramic photos covering the range of 360 degrees, identifying whether there are still other previously recorded allergenic plants and updating a related allergenic plant information database by the plant recognition model,
    wherein training the plant recognition model by the remote server comprises following steps:
    (a) obtaining a sample set comprising a predetermined number of species images annotated with a plurality of feature information;
    (b) determining a plurality of species images from the sample set as a training set and determining a plurality of species images different from the training set from the sample set as a test set;
    (c) training the plant recognition model using the training set;
    (d) determining a model accuracy of the trained plant recognition model using the test set;
    (e) adjusting at least one of the training set and the plant recognition model when the model accuracy is less than a preset accuracy, and re-performing steps (c), (d), and (e) until the model accuracy is not less than the preset accuracy, thereby terminating training of the plant recognition model.

2. The allergenic species broadcasting method according to claim 1, wherein pushing the protection information to the related user according to the sensitization information and the location information of the allergenic species comprises:
    determining whether the allergenic species is in a sensitization period according to at least one of the sensitization information, the growth stage information and current time information of the allergenic species, and pushing the protection information to the related user according to a determining result.

3. The allergenic species broadcasting method according to claim 2, wherein when the allergenic species is in the sensitization period, allergen warning information is pushed to a user within a set area scope.

4. The allergenic species broadcasting method according claim 2, wherein when the allergenic species is not in the sensitization period, allergen early warning information is pushed to a user within a set area scope, once the allergenic species is in the sensitization period, allergen warning information is further pushed to the user within the set area scope.

5. The allergenic species broadcasting method according to claim 2, wherein when the allergenic species is in the sensitization period, the location information and photographing time information of the allergenic species are obtained and annotated and displayed on a regional map.

6. The allergenic species broadcasting method according to claim 2, wherein when the allergenic species is in the sensitization period, a affected degree of the allergenic species on different area scopes is differentiated, annotated and displayed.

7. The allergenic species broadcasting method according to claim 6, wherein overlapping parts of the area scopes affected by different allergenic species are superimposed and differentiated, annotated and displayed.

8. The allergenic species broadcasting method according to claim 6, wherein a number of varieties, a number of individuals, and a distribution density of the allergenic species are calculated for different area scopes to determine a sensitization level of the corresponding area for categorization.

9. The allergenic species broadcasting method according to claim 6, wherein differentiating, annotating and displaying the affected degree on the different area scopes further comprises: obtaining weather information of a current area, and adjusting an affected area and the affected degree of the allergenic species according to the weather information.

10. The allergenic species broadcasting method according to claim 1, wherein the sensitization information comprises at least one of allergy information, information of an allergy transmission method, information of a protection method and information of a treatment method.

11. The allergenic species broadcasting method according to claim 1, wherein pushing the protection information to the related user according to the sensitization information and the location information of the allergenic species comprises:
   pushing the protection information to the related user within a set area scope based on allergy information pre-set by the user.

12. A non-transitory readable storage medium, storing a program, and characterized in that when the program is executed, the allergenic species broadcasting method according to claim 1 is implemented.

13. An allergenic species broadcasting system, characterized in comprising a processor and a memory, wherein a program is stored in the memory, and when the program is executed by the processor, the allergenic species broadcasting method according to claim 1 is implemented.

* * * * *